(12) United States Patent
Sakkinen et al.

(10) Patent No.: US 9,279,166 B2
(45) Date of Patent: Mar. 8, 2016

(54) SEAT STRUCTURAL COMPONENT TAILORED FOR STRENGTH

(75) Inventors: Daniel J. Sakkinen, Highland, MI (US); Ornela Zekavica, Novi, MI (US); Ronald G. Bedro, Plymouth, MI (US); Frederic T. Winters, South Lyon, MI (US); Nicholas L. Petouhoff, South Lyon, MI (US); Anthony Kestian, Highland, MI (US)

(73) Assignee: Johnson Controls Technology Company, Holland, MI (US)

( * ) Notice: Subject to any disclaimer, the term of this patent is extended or adjusted under 35 U.S.C. 154(b) by 829 days.

(21) Appl. No.: 13/508,105

(22) PCT Filed: Nov. 4, 2010

(86) PCT No.: PCT/US2010/055378
§ 371 (c)(1),
(2), (4) Date: Jul. 17, 2012

(87) PCT Pub. No.: WO2011/056923
PCT Pub. Date: May 12, 2011

(65) Prior Publication Data
US 2012/0273089 A1 Nov. 1, 2012

Related U.S. Application Data

(60) Provisional application No. 61/258,768, filed on Nov. 6, 2009.

(51) Int. Cl.
*C22C 38/00* (2006.01)
*C23C 8/22* (2006.01)
(Continued)

(52) U.S. Cl.
CPC ............ *C21D 9/0068* (2013.01); *B60N 2/0722* (2013.01); *B60N 2/68* (2013.01);
(Continued)

(58) Field of Classification Search
CPC .......... B60N 2/0722; B60N 2/68; C21D 1/18; C21D 9/0068; C21D 1/22; C21D 1/25; C21D 2221/00; C21D 2211/002; C21D 9/40; C21D 2211/008; C21D 7/06
USPC ........................................................ 148/218
See application file for complete search history.

(56) References Cited

U.S. PATENT DOCUMENTS 3,606,452 A    9/1971  Riffe
4,593,957 A    6/1986  Hidano
(Continued)

FOREIGN PATENT DOCUMENTS

DE    9416771.0    10/1994
DE    9416771 U1    2/1995
(Continued)

OTHER PUBLICATIONS

Malek Naderi, "Hot Stamping of Ultra High Strength Steels", Nov. 2, 2007, Thesis.*
(Continued)

*Primary Examiner* — Jessee Roe
(74) *Attorney, Agent, or Firm* — The Dobrusin Law Firm, P.C.

(57) ABSTRACT

The present invention relates to a component {1, 2, 3, 4, 6) within the interior of a vehicle. Specifically, the present invention relates to a part of a seat-structure. The present invention further relates to a process to produce a component { 1, 2, 3, 4, 6) within the interior of a vehicle.

12 Claims, 10 Drawing Sheets

(51) Int. Cl.
    *C23C 8/06*     (2006.01)
    *C23C 8/20*     (2006.01)
    *C21D 9/04*     (2006.01)
    *C21D 9/36*     (2006.01)
    *C21D 1/00*     (2006.01)
    *A47B 97/00*     (2006.01)
    *C21D 9/00*     (2006.01)
    *B60N 2/07*     (2006.01)
    *B60N 2/68*     (2006.01)
    *C21D 1/18*     (2006.01)
    *C21D 1/22*     (2006.01)
    *C21D 1/25*     (2006.01)
    *C21D 7/06*     (2006.01)
    *C21D 9/40*     (2006.01)

(52) U.S. Cl.
    CPC . *C21D 1/18* (2013.01); *C21D 1/22* (2013.01); *C21D 1/25* (2013.01); *C21D 7/06* (2013.01); *C21D 9/40* (2013.01); *C21D 2211/002* (2013.01); *C21D 2211/008* (2013.01); *C21D 2221/00* (2013.01)

(56) References Cited

U.S. PATENT DOCUMENTS 5,093,990 A * 3/1992 Klippel .............. 29/897.2
5,338,119 A * 8/1994 Bauer et al. .............. 384/47
2006/0201227 A1 * 9/2006 Lepre et al. .............. 72/370.14

FOREIGN PATENT DOCUMENTS

| | | |
|---|---|---|
| EP | 1 801 244 A1 | 6/2007 |
| JP | 2007-313907 | 12/2007 |
| KR | 10-0780841 | 11/2007 |
| RU | 2 040 552 C1 | 7/1992 |
| WO | 99/47379 | 9/1999 |
| WO | 2006/022186 A1 | 2/2006 |
| WO | 2010/045571 A1 | 4/2010 |
| WO | 2010/088384 A1 | 8/2010 |
| WO | 2010/101040 A1 | 10/2010 |
| WO | 2011/056923 A1 | 5/2011 |

OTHER PUBLICATIONS

ASM International, Materials Park, Ohio, Properties and Selection: Irons, Steels, and High Performance Alloys, "Classifcation and Designation of Carbon and Low Alloy Steels", Mar. 1990, pp. 140-159.*

"Several Problems when Strengthening Metal Material with Consecutive Laser Rays", Li Ruxun, Electromachining & Mould, No. 2: 21-26; Apr. 30, 1991.

Second Office Action from the Chinese Patent Office dated Feb. 27, 2014; Application No. 2010800598369.

Korean Office Action dated Oct. 28, 2013; Appln. No. 10-2012-7014747.

* cited by examiner

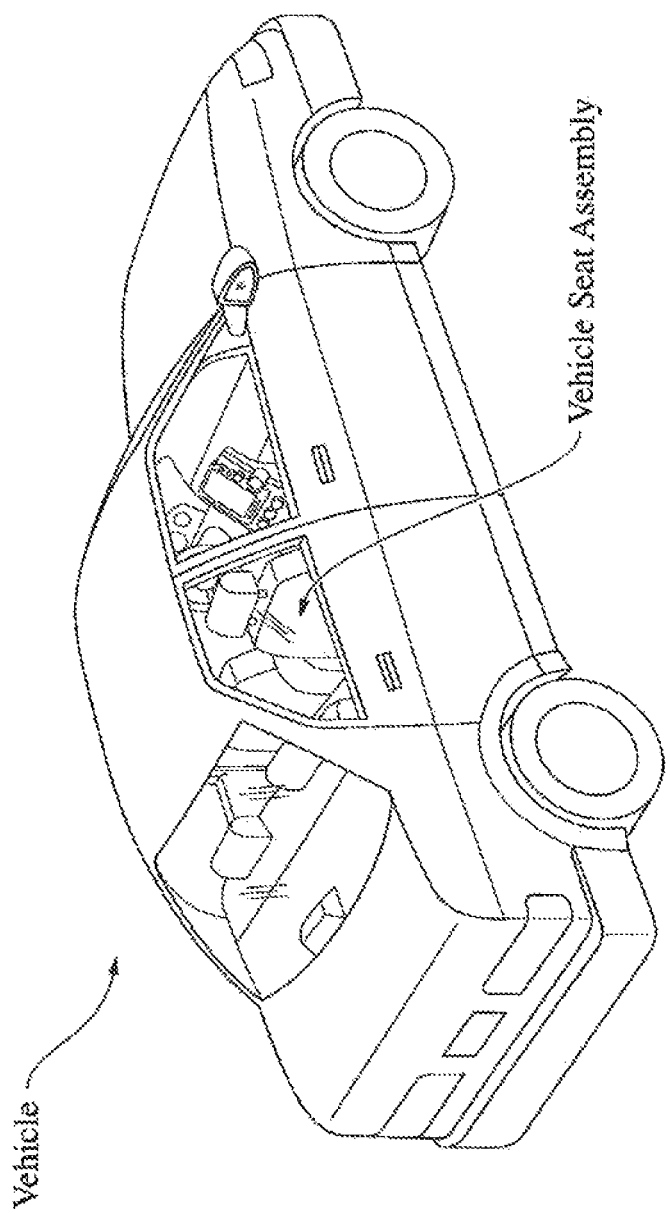

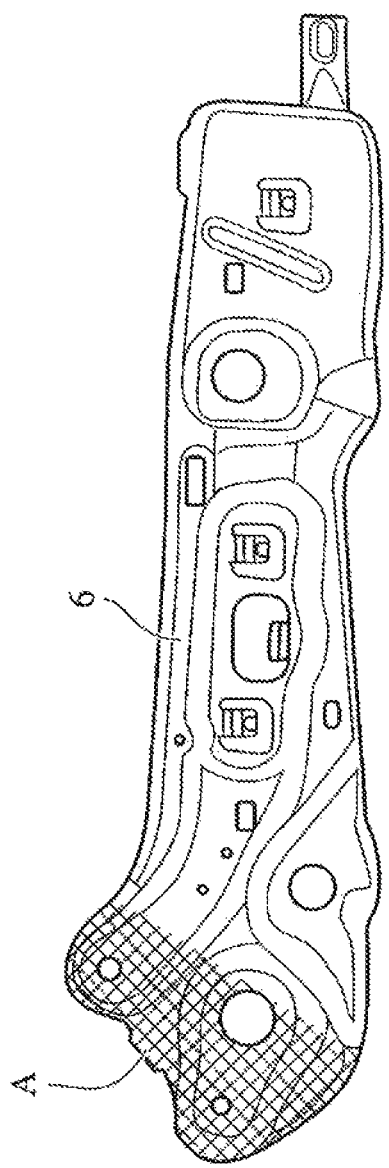
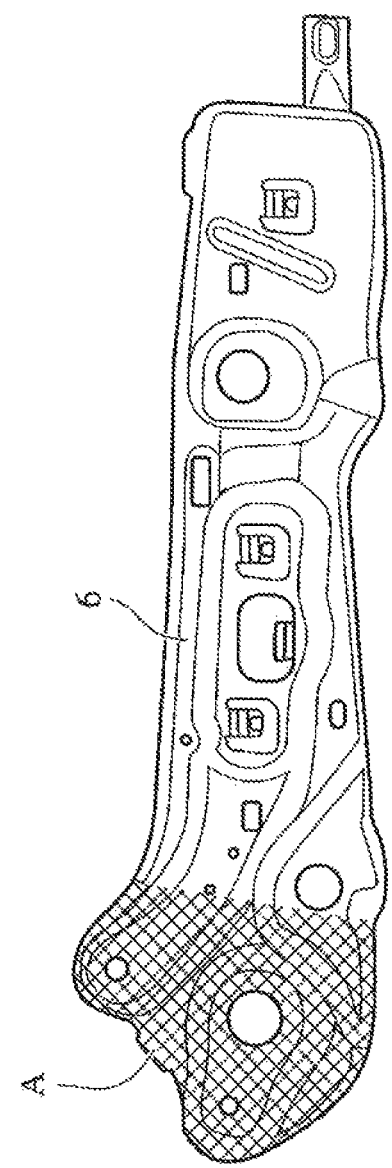

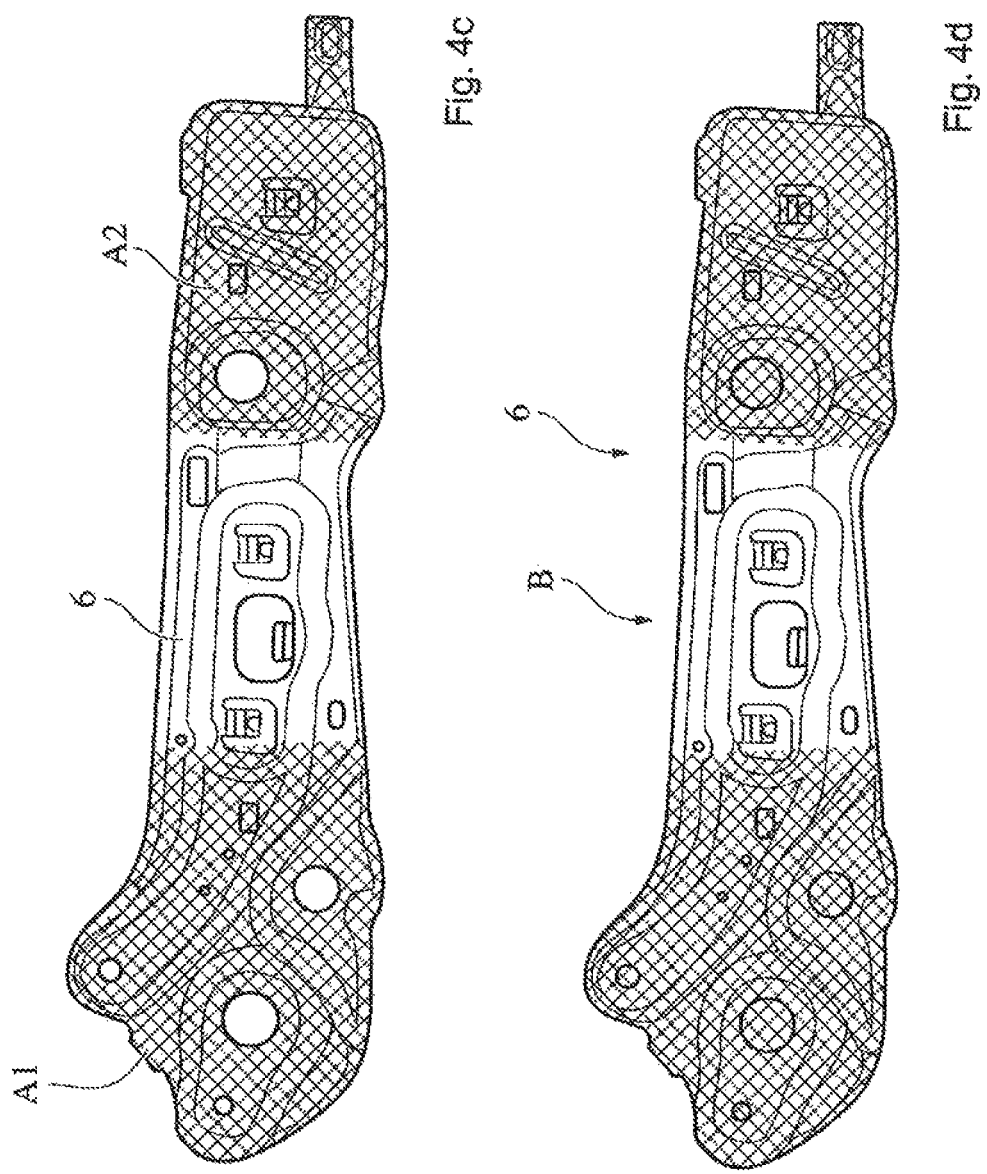

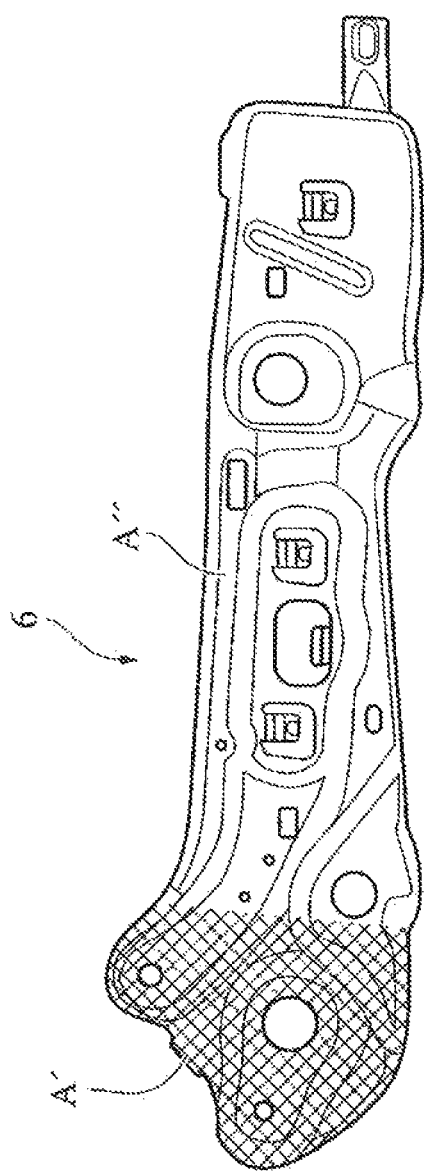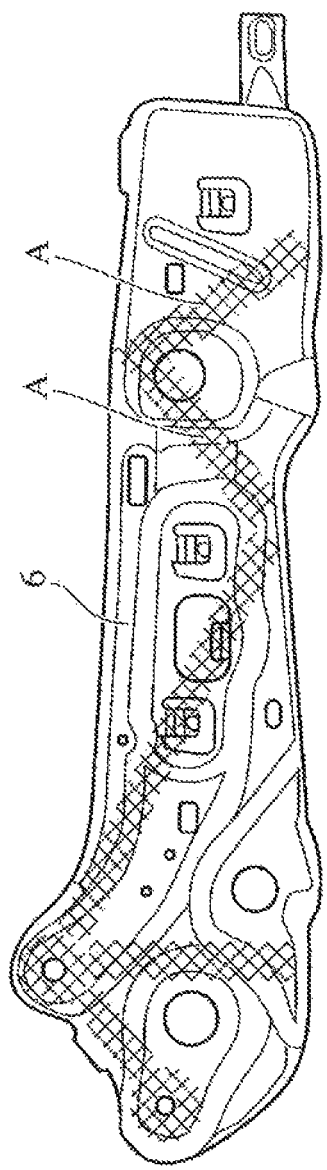

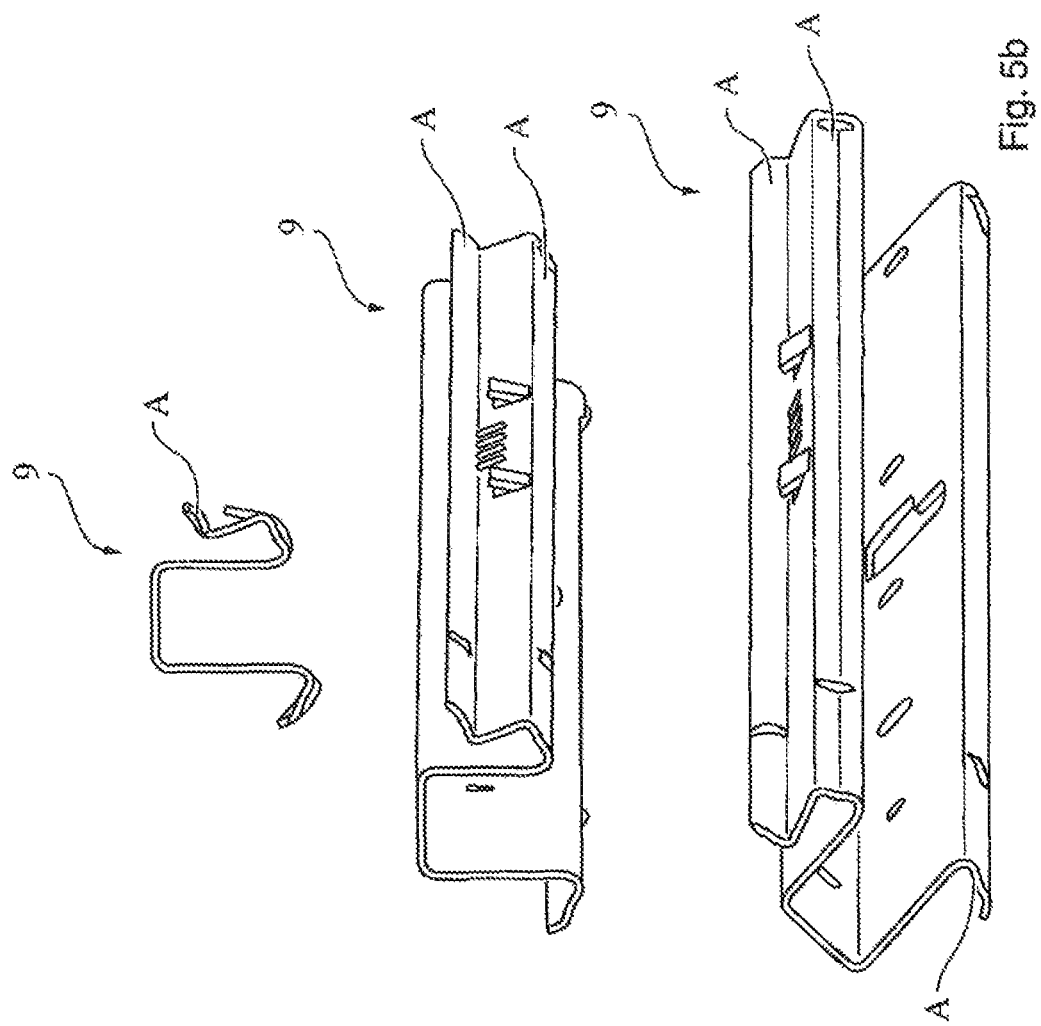

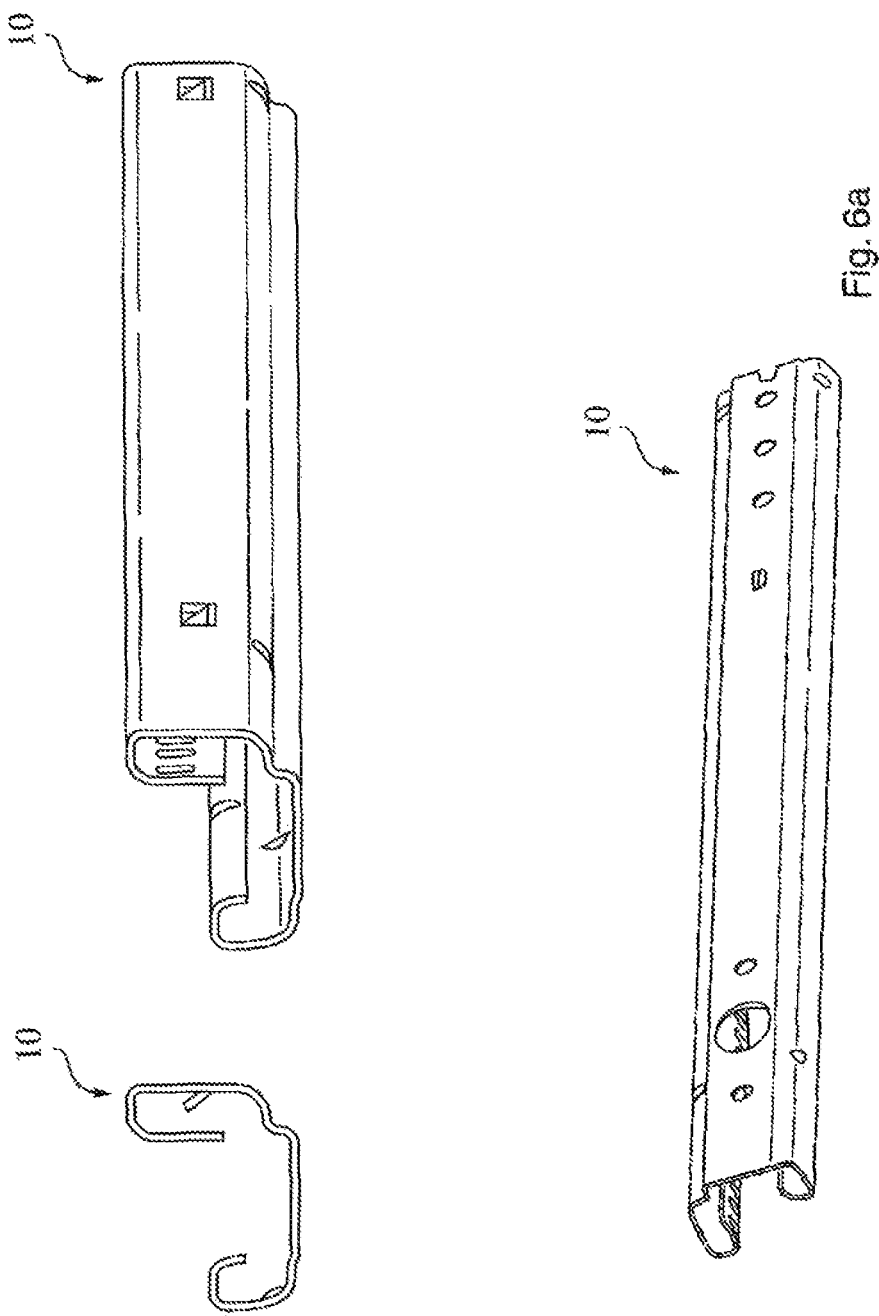

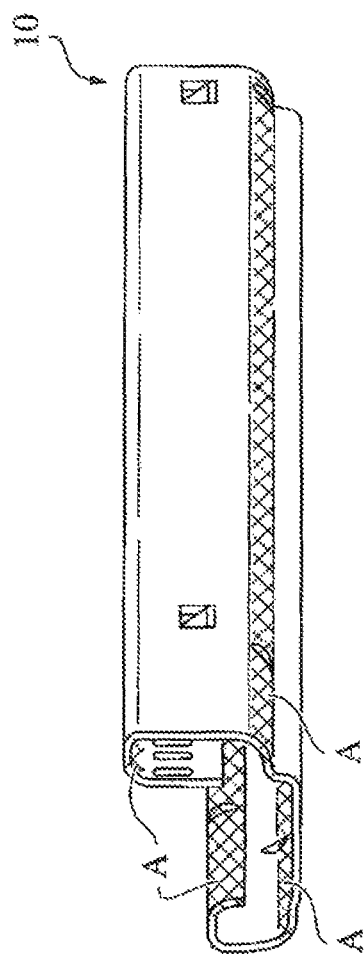
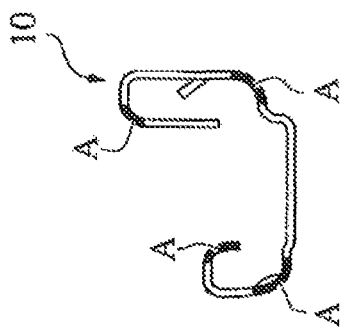
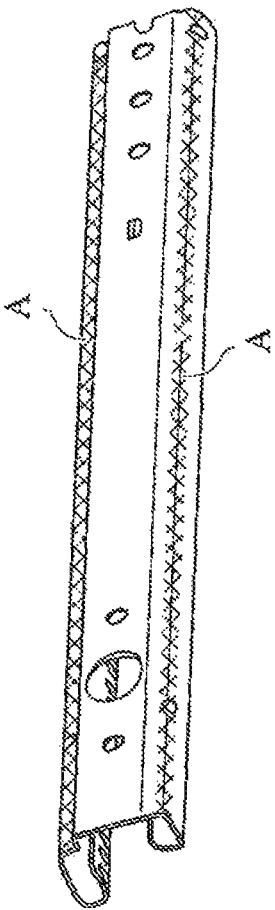
Fig. 6b

SEAT STRUCTURAL COMPONENT TAILORED FOR STRENGTH

CLAIM OF PRIORITY

The present application claims the benefit of the filing date of U.S. Provisional Application Serial No 61/258,768 (filed Nov. 6, 2009) and the entirety of the contents of this application being hereby expressly incorporated by reference.

BACKGROUND

The present invention relates to a component within the interior of a vehicle. Specifically, the present invention relates to a part of a seat-structure. The present invention further relates to a process to produce a component within the interior of a vehicle.

Parts in the interior of a vehicle, especially a vehicle seat and its structure, are well known to a person skilled in the art. Such a vehicle-seat comprises a seat base and a seat back. The seat back is in most cases attached to the seat base by means of a recliner. The seat back as well as the seat base each comprises a structure, for example a frame, which, in most cases, is covered by a cushion, which is surrounded by a seat cover. The interior parts, especially the parts of the seat structure are often stamped components with intricate shapes, which must have a very high strength, especially in order to cover crash loads. It would therefore be desirable to produce these components from high strength material. However, high strength material is difficult to stamp, because it will split or crack during stamping, causing the component to be unsuitable for use.

It was therefore the objective of the present invention to provide a vehicle-interior-component, with an intricate shape and a high strength. It is another objective of the present invention, to provide a process to produce vehicle-interior-components with an intricate shape and high strength.

SUMMARY

The problem is solved by providing a vehicle-interior-component made from metal, which is first formed and then treated entirely and/or locally to modify its material strength. The problem is also solved with a process for the treatment of vehicle-interior-component made from metal, whereas it is firstly formed and then treated to modify entirely and/or locally its material strength.

The following disclosure applies to the inventive component as to the inventive process, likewise.

The present invention relates to a component located within the interior of a vehicle. This component can be any vehicle-interior-part. Preferably, this component is part of the structure of a vehicle seat: i.e. part of the seat base- and/or the seat back-structure and her preferably the frame or part of the frame. More preferably, the component is the side-member and/or a connecting element, whereas two side members and two connecting elements form the frame of the seat base or the seat back. In another preferred embodiment, the component is part of a seat adjuster, particularly at least one of the two rails for the fore/aft adjustment of the seat.

A vehicle seat according to the present invention can be any seat inside the vehicle, which provides seating space for one or more vehicle occupants, i.e. the seat, according to the present invention, can also be a bench.

The component is made from metal, preferably from steel, for example boron treated steel, more preferably from a preferably rolled steel-plate. Preferably, a steel is chosen that has low or moderate strength, for example boron steel (DB 200) with 400-600 MPa stress at 00.2-0.07 strain. This component is first of all formed, preferably into a three dimensional shape. The material of the component is brought into the desired shape of the component by cold forming, especially, e.g. a steel-plate is formed "as rolled". The cold forming can be carried out by stamping. Since the material utilized has low or moderate strength, it is possible to bring the material in the desired shape, especially an intricate shape. Before, during or after the forming, holes can be inserted into the material of the component. This can be for example done by drilling or punching. The preferably desired thickness of the component, if made from metal is 0.8-1.5 mm.

After the forming, the component is treated to alter locally or entirely the material strength. Preferably, the material strength is locally increased. In another preferred embodiment, the material strength of the entire component is increased. In yet another embodiment, the strength of the component is increased locally or entirely and than locally decreased again. The targeted material properties in the treated area are preferably 1000-1200 MPa for $R_p$ and 1300-1500 MPa for $R_m$.

The treatment to increase the local strength can be, for example, carried out by the following processes: annealing, austempering, carbonitriding, carburizing, case hardening conventional hardening (for example quench and temper), homogenizing, hot isostatic pressing, martempering, normalizing, aging, shot peening/blasting, solution treating, stabilizing and/or stress relieving. Useful equipment to treat the inventive component is a furnace preferably with protective atmosphere, salt bath and/or vacuum, as well as a flame/torch, a laser and/or an electron beam. Induction heating is another alternative to treat the inventive component, especially locally.

One preferred method of heat treating the vehicle-interior-component locally or entirely is induction hardening. In induction hardening, an electromagnetic field is used to induce eddy currents in the work piece that causes a resistive heating effect to occur. The heating can be controlled through proper induction coil design to localize the heating. The rate of heating is very high as compared with other heating methods. When the steel has been heated to a sufficient temperature the induction is halted.

Preferably, after heating, the component is cooled at a rate fast enough to support transformation of the steel's microstructure to martensite and/or bainite where the strength level is greatly enhanced over the untreated material.

An advantage of using induction heating is that the heating pattern can be very tightly controlled, especially locally. This allows sections of the heat treated component to be left in an un-heat-treated condition in relatively close areas. Thus, a components strength can be tailored for high strength where required and lower strength but high ductility in other areas. Lower strength areas have the advantage that they absorb energy due to their deformation, for example during a crash.

The seat lower side member is a component that can benefit from high strength throughout the component. However, a varied strength throughout this component is preferred. The area that needs the highest strength is the area around the recliner attachment area. Due to the initial low or moderate strength of the material, the component can be formed with deep sections. After forming, the area around the recliner attachment, is strengthened, for example by heating, especially induction heating, and preferably subsequent quenching.

Another area where higher strength may be required is in the front section of the side member component. Due to the initial low or moderate strength of the material, the component can be formed with deep sections. After forming the area around the recliner attachment, is strengthened, for example by heating, especially induction heating, and preferably subsequent quenching.

Preferably, the center section of the side member is left in a soft and ductile condition. This may be beneficial in managing strength of the component but also in managing energy imparted to the structure during a crash event.

In a preferred embodiment, vehicle interior component is at least one of the two rails for the longitudinal adjustment of the seat. Between these rails, normally, rolling elements are provided to reduce the friction. Preferably at least one of these rails is hardened at least locally, particularly the region which is in touch with the rolling elements, in order to, for example, improve durability and/or smoothness. Another preferred area for hardening is the area of the rails, where the latching of the two rails occurs. Here the local strength is preferably improved.

The invention is now explained in more detail according to figures. These explanations do not limit the scope of protection.

BRIEF DESCRIPTION OF THE DRAWINGS

FIG. 1 is a perspective view of a vehicle having eat comprising the inventive component according to an exemplary embodiment.

FIG. 4a-h show different exemplary embodiments of the inventive component and how it is manufactured.

FIG. 5a-b show the upper rail of a seat adjuster.

FIG. 6a-b show a lower rail of the seat adjuster.

DETAILED DESCRIPTION

Figure 2:
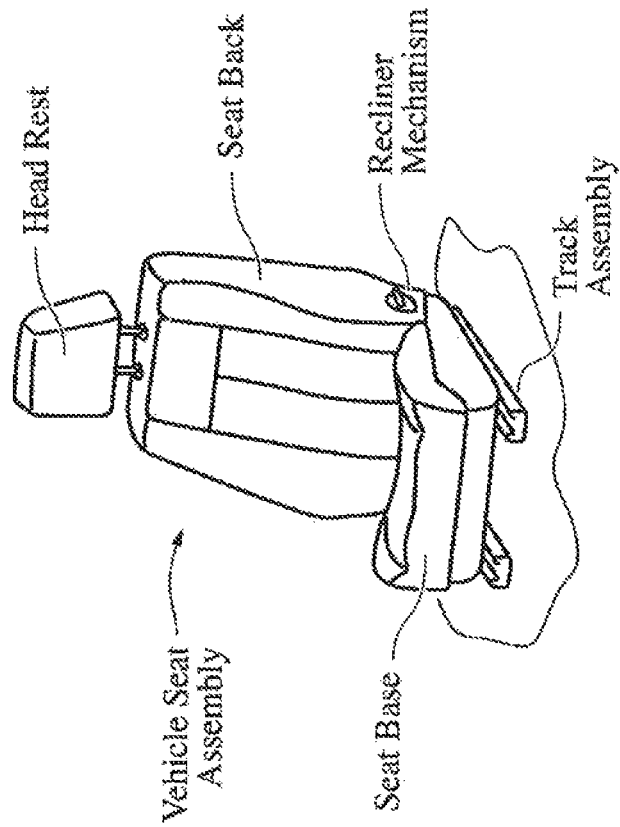
FIG. 2 is a perspective view of a vehicle seat structure having the inventive component according to an exemplary embodiment.

Referring generally to the figures and in particular to FIG. 1, a vehicle is shown according to an exemplary embodiment. The vehicle includes one or more vehicle seats provided for an occupant of the vehicle. One exemplary embodiment of a vehicle seat structure is shown in FIG. 2. While the vehicle shown is a 4-door sedan, it should be understood that the seat may be used in a mini-van, sport utility vehicle or any other means in or by which someone travels or something is carried or conveyed for any market or application including everything from office seating and transportation to air planes and space travel and everything in between. The vehicle seat shown includes a seat back, a seat base, and a connection member or recliner coupled to the seat back and the seat base. The vehicle seat further includes a head restraint and base portion. The headrest extends upward form the seat back and is configured to restrain the head of an occupant. The base portion e.g. track assembly) couples the seat to the vehicle body and may be configured to allow the seat to be selectively positioned (manually or motor driven) relative to the vehicle body.

Figure 3:
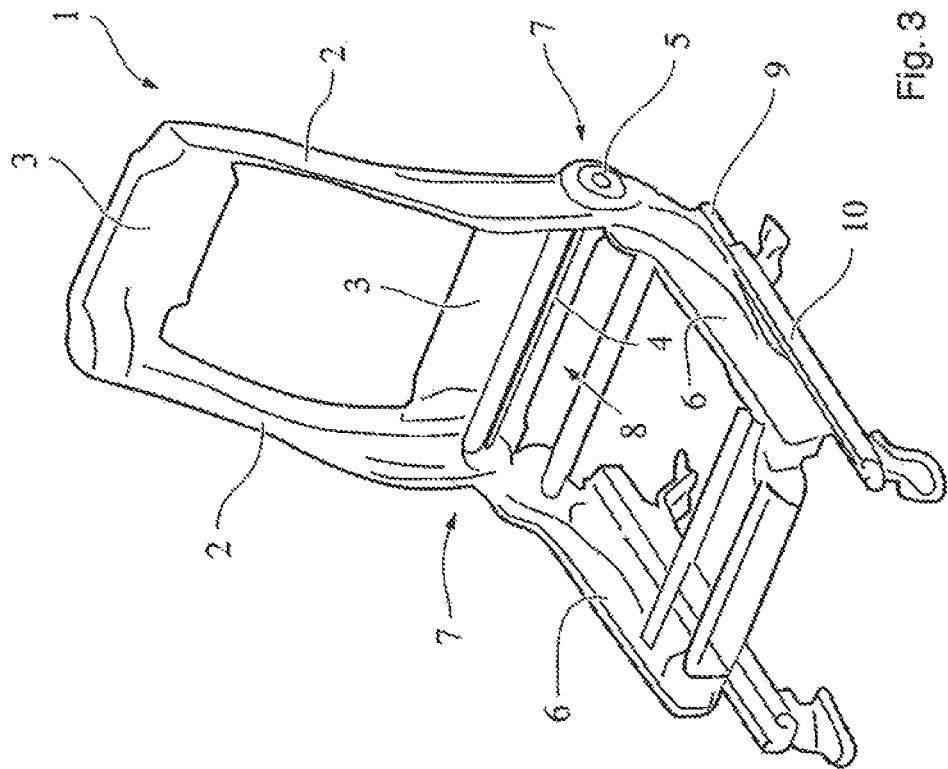
FIG. 3 shows the frame of the backrest of a vehicle seat, having the inventive component according to an exemplary embodiment.

FIG. 3 shows the frame of a vehicle seat. This frame comprises a frame 1 of the seat back. The vehicle seat is longitudinally adjustable by means of rails 9, 10. The frame 1 comprises two side members 2, which are connected by an upper and a lower connecting member 3 to form a frame. In its lower part, the frame comprises a side impact tube 4 and two recliners 5, which connect the seat back with the seat base. The seat base also comprises side members 6, which are connected with connecting members. According to the present invention, the side members 2, 6 as well as the side impact tube 4 are now locally treated to locally improve their strength. The side members are for example, treated in the area 7, where the recliner is attached to the side members. The side impact tube 4 is treated in the area 8, in order to improve its buckling resistance to the needed strength. The person skilled in the art understands that the strength of the entire side member 2, 6 and the entire side impact tube 4 can be improved if needed. However, local improvement of the strength is preferred. In the present case, the strengthening has been carried out by local heat treatment. Due to the treatment, the fracture strength $R_m$ and the yield strength $R_p0.2$ have been increased by at least 100%, preferably 150% and more preferably 200%.

FIGS. 4a-4h show the side member 6 of the seat base. Two side members 6 located to the left and to the right of the seat base and are part of its structure, especially its frame. The frame is in most cases connected to an upper track 9, which is movable along a lower track 10 connected to the body of the car, in order to longitudinally adjust the position of the seat. Means to adjust the height of the vehicle seat can also be attached to the side member of the seat base. The side member has in its area A connecting means for the recliner. In this limited region, as indicated by the shaded area in FIG. 4a, the strength of the side-member-material has been increased, for example by heating, especially induction heating this area and subsequent quenching. This area is the area in which highest strength in the component is needed, because it is the area where the recliner is connected to the side member.

As already highlighted above, the shape of the area with improved strength cart be controlled carefully. In comparison to FIG. 4a, the treated area in the embodiment according to FIG. 4b has been increased. The area is for example treated by induction heating.

The component according to FIG. 4c has been treated in two areas A1 and A2, in which the mechanical strength of the side member 6 has been increased. In these areas all mechanical loads are transferred into the side member, so that high mechanical strength is needed. Both areas A1 and A2 are heat treated. Between the two areas A1 and A2 is an area with relatively low mechanical strength, which can be the original strength of the material from which the side member has been manufactured or an area, in which the mechanical strength has been less increased than in areas A1 and A2. The "soft" area between the areas A1 and A2 can be especially beneficial for the energy absorption during a crash.

FIG. 4d depicts an example how to manufacture a side member according to FIG. 4c. The side member is first heat treated entirely to improve its strength and then softened again in the area B to reduce the material strength. The reduction of the strength in the center section can be achieved by selectively annealing such as by gas flame heating to reduce the strength.

The embodiment according to FIG. 4e is an alternative to the embodiment according to embodiment of FIG. 4b, where the two end sections are heat treated but to different strength levels. In the embodiment according to FIG. 4e, both areas A' and A" have been treated, here heat treated, in order to improve their mechanical strength. However, changing treatment parameters cause higher strengthening in the area A' and lower strengthening in the area A".

In the embodiment according to FIG. 4f, a heat treatment pattern in the shape of a truss has been chosen, in order to promote proper load flow through the part.

Figure 4G:
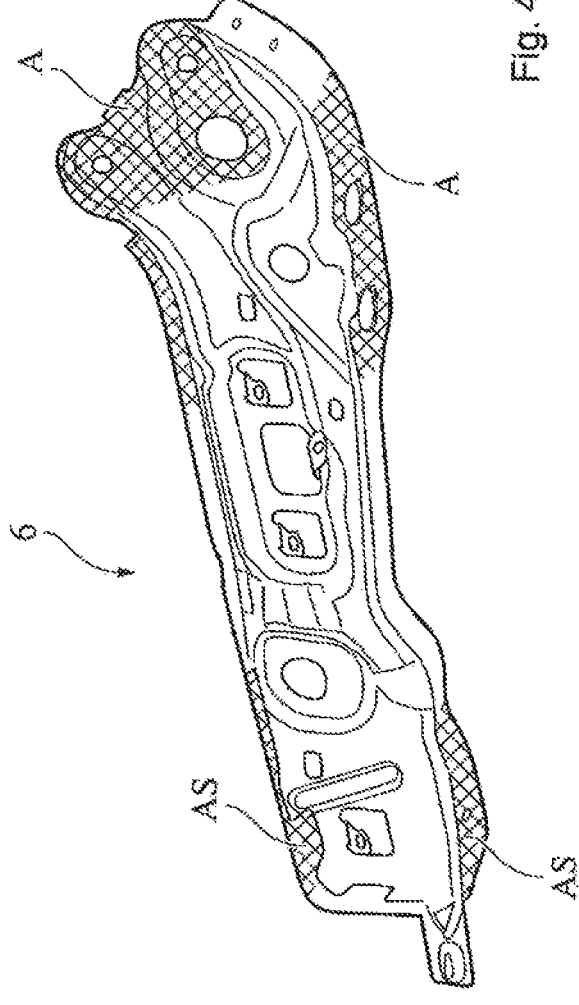
Figure 4H:
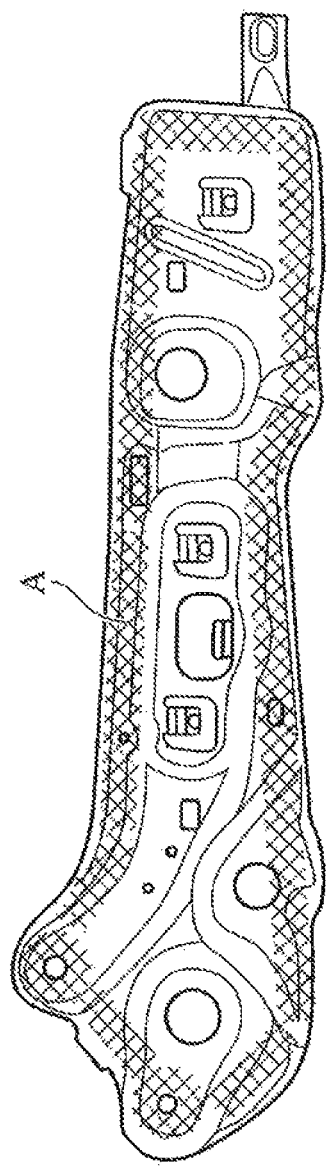

In the embodiment according to FIG. 4g, treatment, here heat treatment of the limited A and the flanges area Af in their limited length (shown) and/or full length (not shown) has been carried out.

In the embodiment according to 4h, the perimeter of part 6, particularly the flange has been heat-treated.

Figure 5A:
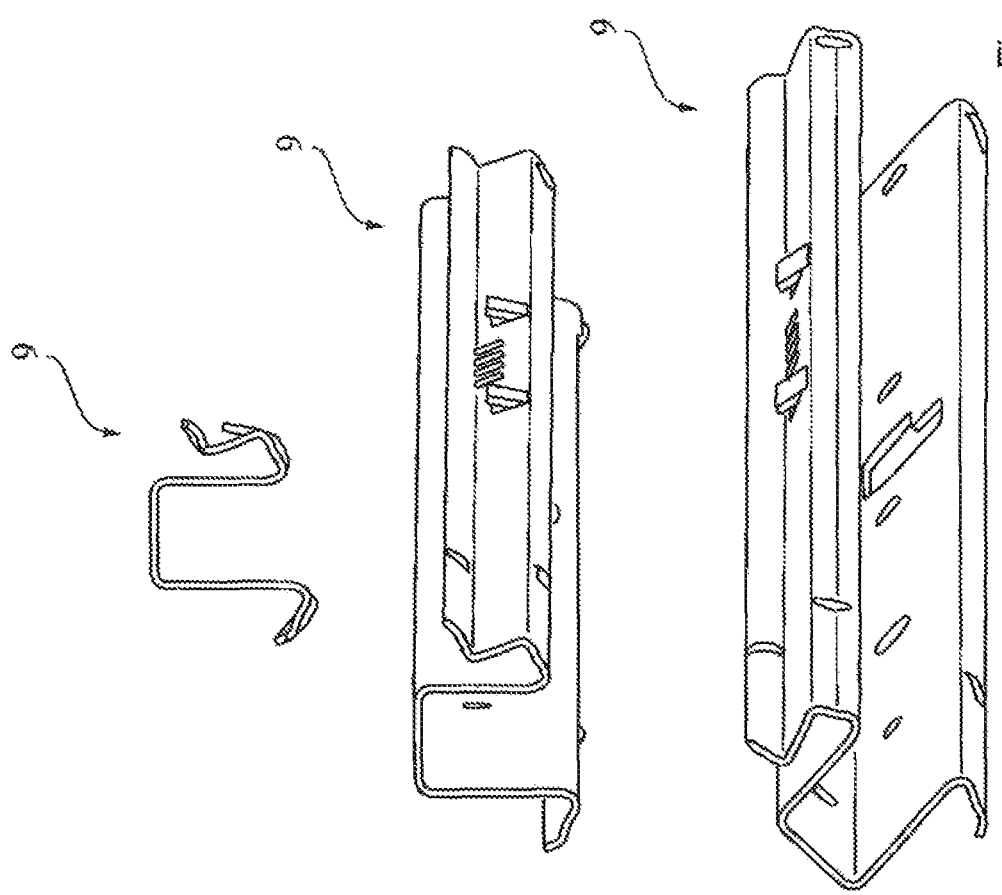

FIG. 5a shows an upper rail 9 according to the state of the art in three views, which is connected to the seat base. FIG. 5b, shows the rail shown in FIG. 5a modified according to the present invention. The areas A of the ball races have been heat treated to improve their material properties, especially their durability and/or their smoothness. The latching area can also be locally treated to improve the material properties.

FIG. 6a shows an lower rail 10 according to the state of the art in three views, which is connected to the seat base. FIG. 6b shows the rail shown in FIG. 6a modified according to the present invention. The areas A of the ball races have been heat treated to improve their material properties, especially their durability and/or their smoothness. The latching area can also be locally treated to improve the material properties.

REFERENCE SIGNS

1 Frame of the seat back
2 Side members of the seat back
3 Connecting member
4 Side impact tube
5 Recliner
6 Side member of the base
7 Area of increased material strength
8 Area of increased material strength
9 Upper rail
10 Lower rail
A Area of high strength
A1 Area of high strength
A2 Area of high strength
A' Area of high strength
A" Area of high strength
Af Area of high strength
B softening area

The invention claimed is:

1. A vehicle-interior-component selected from a side member of a back of a vehicle seat and, a side member which is set under the vehicle seat, wherein the component is made from metal, which is formed and then treated entirely and/or locally in a treated area to modify its material strength, wherein the treated area is an area where a recliner is attached to the side member of the back of the vehicle seat or an area where the recliner is attached to the side member set under the vehicle seat, wherein the treated area of the component includes a front section of the side member of the back of the vehicle seat and/or of the side member set under the vehicle seat.

2. The vehicle-interior-component according to claim 1, wherein the material strength is increased entirely or locally.

3. The vehicle-interior-component according to claim 1, wherein the component is made from boron steel.

4. The vehicle-interior-component according to claim 1, wherein the material strength is increased and the increased material strength for the treated area exhibits a yield strength, $R_p$, of from 1000 to 1200 MPa for and/or a fracture strength, $R_m$, of from 1300 to 1500 MPA.

5. The vehicle-interior-component according to claim 1, wherein the component is treated locally and the material strength for the untreated area exhibits a yield strength, $R_p$, of from 600 to 800 MPa and/or a fracture strength, $R_m$, of from 900 to 1100 MPA.

6. The vehicle-interior-component according to claim 1, wherein the seat comprises one or more ball races and a latching area wherein the ball races and/or the latching area are modified in their material strength in the upper rail and/or the under rail.

7. A vehicle-interior-component selected from a side member of a back of a vehicle seat and a side member which a set under the vehicle seat, wherein the component is made from metal, which is formed and then treated entirely and/or locally in a treated area to modify its material strength, wherein the treated are is an area where a recliner is attached to the side member of the back of the vehicle seat or an area where the recliner is attached to the side member set under the vehicle seat, and wherein a center area of the side member of the back of the vehicle seat and/or the side member set under the vehicle seat is left in a soft and ductile condition.

8. The vehicle-interior-component according to claim 7, wherein the material strength is increased entirely or locally.

9. The vehicle-interior-component according to claim 7, wherein the component is made from boron steel.

10. The vehicle-interior-component according to claim 7, wherein the material strength is increased and the increased material strength for the treated area exhibits a yield strength, $R_p$ of from 1000 to 1200 MPa for and/or a fracture strength, $R_m$, of from 1300 to 1500 MPA.

11. The vehicle-interior-component according to claim 7, wherein the component is treated locally and the material strength for the untreated area exhibits a yield strength, $R_p$, of from 600 to 800 MPa and/or a fracture strength, $R_m$, of from 900 to 1100 MPA.

12. The vehicle-interior-component according to claim 7, wherein the seat comprises one or more ball races and a latching area wherein the ball races and/or the latching area are modified in their material strength in the upper rail and/or the under rail.

* * * * *

UNITED STATES PATENT AND TRADEMARK OFFICE
CERTIFICATE OF CORRECTION

| | | |
|---|---|---|
| PATENT NO. | : 9,279,166 B2 | Page 1 of 1 |
| APPLICATION NO. | : 13/508105 | |
| DATED | : March 8, 2016 | |
| INVENTOR(S) | : Daniel J. Sakkinen | |

It is certified that error appears in the above-identified patent and that said Letters Patent is hereby corrected as shown below:

Claims

Column 5, Line 43, Claim 1, "seat and," should be "seat and"

Column 6, Line 22, Claim 7, "a set" should be "is set"

Column 6, Line 26, Claim 7, "treated are" should be "treated area"

Signed and Sealed this
Third Day of May, 2016

Michelle K. Lee
*Director of the United States Patent and Trademark Office*